Figure 1:
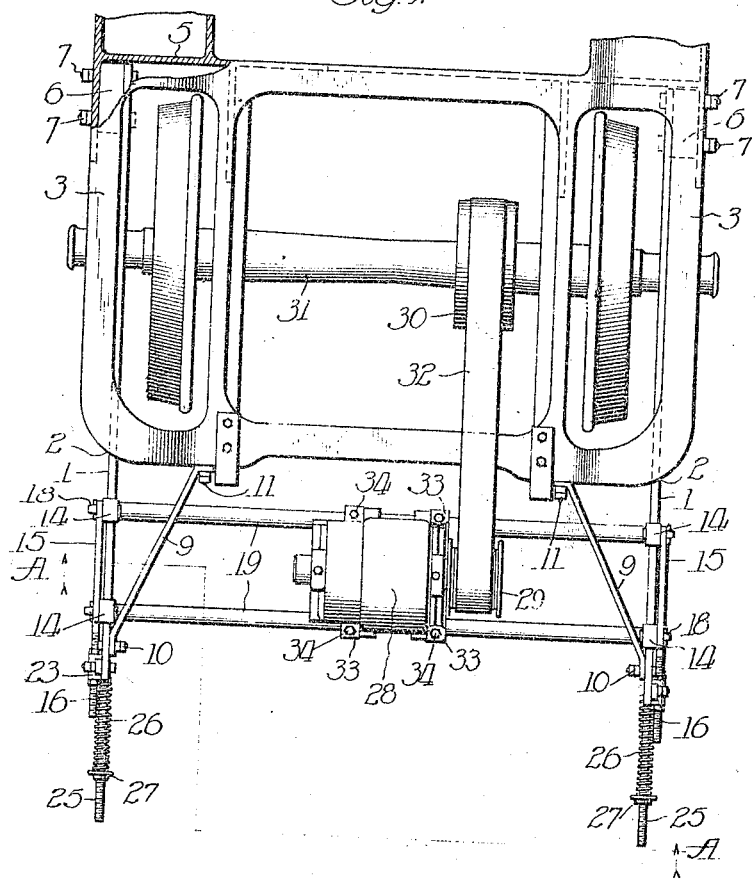

W. L. BLISS.
SUSPENSION FOR AXLE GENERATORS.
APPLICATION FILED JUNE 6, 1910.

1,188,397.

Patented June 27, 1916.
2 SHEETS—SHEET 1.

Witnesses:
Robert N. Weir
Geo. B. Jones

Inventor:
William L. Bliss
By Edwin B. H. Tower Jr.
Atty.

W. L. BLISS.
SUSPENSION FOR AXLE GENERATORS.
APPLICATION FILED JUNE 6, 1910.
1,188,397.
Patented June 27, 1916.
2 SHEETS—SHEET 2.
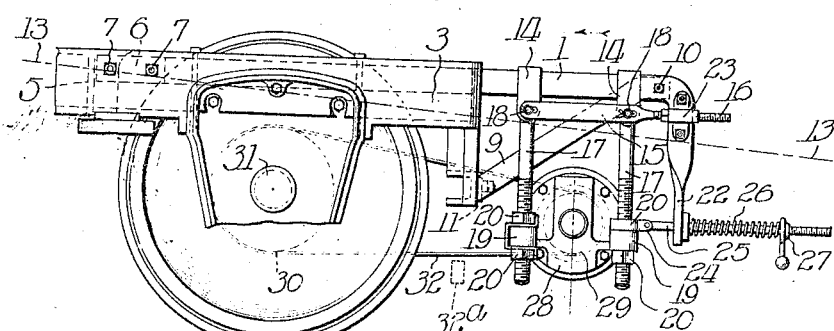
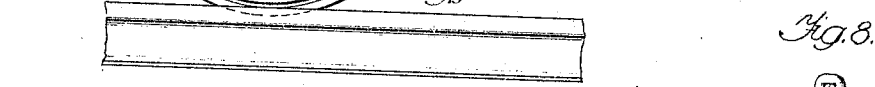
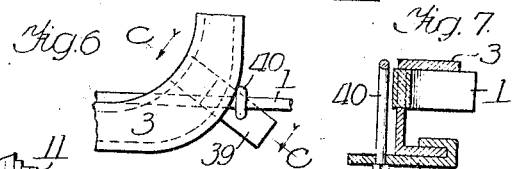
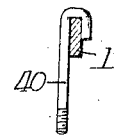
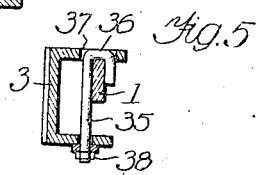
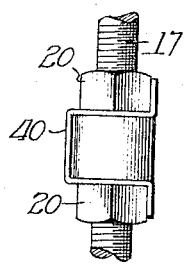
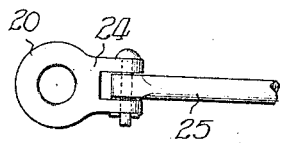
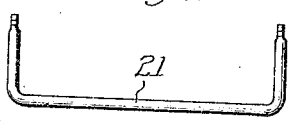
Witnesses:
Robert H. Weir
Geo. B. Jones
Inventor:
William L. Bliss
By Edwin B. H. Tower Jr.
Atty.

UNITED STATES PATENT OFFICE.

WILLIAM L. BLISS, OF MILWAUKEE, WISCONSIN, ASSIGNOR, BY MESNE ASSIGNMENTS, TO U. S. LIGHT AND HEAT CORPORATION, OF NIAGARA FALLS, NEW YORK, A CORPORATION OF NEW YORK.

SUSPENSION FOR AXLE-GENERATORS.

1,188,397.

Specification of Letters Patent. Patented June 27, 1916.

Application filed June 6, 1910. Serial No. 565,267.

*To all whom it may concern:*

Be it known that I, WILLIAM L. BLISS, a citizen of the United States, residing at Milwaukee, in the county of Milwaukee and State of Wisconsin, have invented new and useful Improvements in Suspensions for Axle-Generators, of which the following is a full, clear, concise, and exact description, reference being had to the accompanying drawing, forming a part of this specification.

My invention relates to improvements in suspensions for axle driven generators.

The invention set forth in this application is a modification of the structure shown in my co-pending application No. 491,704, filed August 23, 1909, and certain features of the present structure are covered in said former application.

One of the objects of this invention is to provide a generator mounting having means for readily permitting of various adjustments and adapted to support a generator in accurate alinement with the driving means, and furthermore, to combine said mounting with a steel truck frame of standard construction in such a manner as to take advantage of certain structural features inherent in said truck frame, whereby said generator mounting becomes practically a part of said frame, but without appreciably weakening the same, and without in any manner interfering with or restricting the movement of the truck with reference to the car beneath which it is placed, particularly when said truck swivels about its king pin.

In furtherance of this object, I aim to provide a generator mounting, no part of which shall extend beyond the imaginary lines usually accepted as a safe limit within which to confine the parts of the standard car truck.

Another object of the invention is to so mount the generator that the same will be readily accessible for inspection, repairs, removal or adjustment.

For the purpose of further disclosing the various advantageous features of my invention, I have illustrated in the accompanying drawings, one embodiment of the main features of the same.

The invention is susceptible of various modifications, the present arrangement being particularly adapted for use in connection with the steel car trucks used on steel railway cars, having deep center sills of the girder type.

Figure 2:
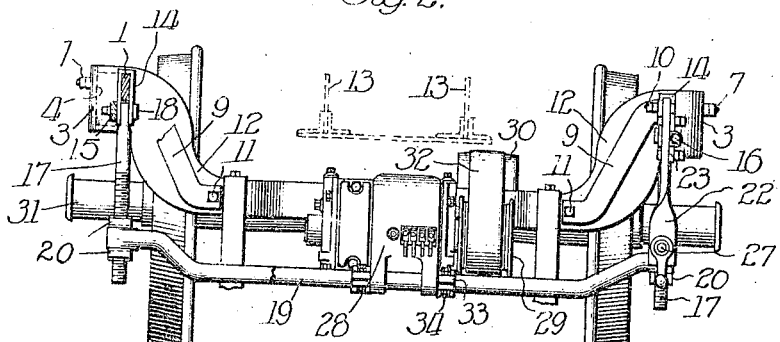

In the drawings:—Figure 1 is a top plan view of part of a steel car truck equipped with one form of generator mounting. Fig. 2 is an end elevation and partial section on line A—A, Fig. 1, of the same. Fig. 3 is a side elevation. Fig. 4 is a detail of a modification. Fig. 5 is a section on line B—B, Fig 4. Fig. 6 is a further modification. Fig. 7 is a section on line C—C, Fig. 6. Fig. 8 is a detail. Fig. 9 is a modification of another detail. Figs. 10, 11 and 12 are enlarged details.

Two main longitudinal parallel suspension bars 1, 1, are provided, from which is suspended the generator. The two main suspension bars pass through and are held upright in spaced relation to each other by openings 2, 2, either cut or cast in the ends of the two outside longitudinal wheel beams 3, 3, of the truck frame. These beams are channel-shaped in cross section, as seen at 4, in Fig. 2. The main suspension bars when slipped into their openings 2, extend back to the cross piece or transom 5, and being fulcrumed at the forward end of the truck frame at the openings 2, 2, they preferably bear against the under side of the upper flanges of the box or channel shaped transom 5, at the rear thereof, and may be spaced from the outer vertical portion of said wheel beams by wooden blocks or fillers 6, 6. The truck frame may be provided with other parts to engage the suspension bars to hold the same in place, the idea being to suitably construct the truck frame and the suspension bars so that they may be readily and firmly attached to each other. It is thus apparent that the suspension bars are confined by the truck frame itself, without the need of auxiliary fastening means, although to prevent the parts working loose, suitable bolts 7, 7, are provided, which retain said members 1, 1, and blocks 6, 6, in position.

In order to secure stability and rigidity of construction, I preferably provide fastenings for the suspension bars at three points. First at the inner ends of the suspension bars, previously mentioned, bolts 7, 7, are provided to prevent lateral displacement. Second, at the fulcra of the suspension bars where they pass through the openings 2, 2, I provide clamps or holding down bolts as shown in Figs. 5, 6, 7 and 8. The openings 2, 2, are generally somewhat larger than the suspension bars and these fastenings are desirable to prevent rattling. Third, at the outer end of the suspension bars, I provide braces 9, 9, attached to said suspension bars and the end sill of the truck frame, to prevent lateral displacement of said ends. All three sets of fastenings further prevent the suspension bars from being pulled out longitudinally from their normal positions. It is desirable to reinforce the metal about the openings 2, 2, in the truck frame by the addition of bosses formed integrally with the truck frame either inside or out, or both. This increases the area of the bearing of the suspension bars in the truck frame and strengthens the same to compensate for the metal removed in making the opening. It will be apparent from Fig. 2 that the truck frame dips down considerably at 12, 12, for the purpose of providing ample clearance for the center sill or plate girders 13, shown in dotted line section in this figure, and used to stiffen the floors or underframes of steel cars. The girder construction is indicated in Fig. 3 also, by the dotted line 13, 13, and the point at which the section shown in Fig. 2 is taken, is directly above the center of the generator, as indicated by the arrow in Fig. 3. It is thus apparent that the actual clearance above the pulleys and belt is much greater than the apparent clearance shown in Fig. 2.

Inverted U-shaped stirrups 14, 14, in the preferred construction are hung over the main suspension bars 1, 1, and are held in fixed relation by space bars 15, 15, each having a reduced threaded extension 16, 16, for the purpose of adjusting the positions of said stirrups on the supporting members as hereinafter described. Each stirrup 14, supports a suspension link or rod 17, by means of a pivotal connection 18, said rods having their lower portions screw-threaded and passing through the ends of cross-bars, or eye-bars 19, 19, which cross-bars or eye-bars constitute the immediate support for the generator. The said links are therefore pivoted below the suspension bars in the preferred construction, although I do not limit myself to this arrangement. The eye-bars are held in adjustable relation to the suspension links by means of two nuts 20, 20, one above and one below the opening in the eye-bar, although any suitable adjusting means may be employed. Consequently said cross-bars or eye-bars are readily detachable from the depending links. The said links and the cross-bars may, of course, be detachably secured in other ways. It will be apparent that the cross-bar and its two links constitute in effect a U-shaped support or sling, and furthermore, said members may be integral if desired, as shown at 21, Fig. 9. The latter construction is described and claimed in the co-pending application, Serial No. 491,704, above referred to.

The outboard ends of the main suspension bars 1, are bent downwardly approximately at a right angle, and have their extremities 22, twisted into a plane at right angles to the length of the truck and car. The guides 23 are bolted to the turned down portions of the main suspension bars and these guides coöperate with the screwthreaded extensions 16 and nuts carried thereby, as shown, to provide a convenient means of adjusting both stirrups and suspension links longitudinally of the suspension bars and toward and away from the axle 31.

Some of the nuts 20 are provided with a bifurcated extension 24, see Fig. 10, adapted to pivotally connect with the tension rods 25 which pass through a hole in the twisted lower extremity 22 of the suspension bars and are normally impelled away from the car axle by springs 26, between said twisted ends and adjustable tension nuts 27.

As seen more particularly in Fig. 2, the eye-bars 19 have preferably a depressed or bent down middle portion whereon the generator 28 is pivotally supported, although I do not limit myself to this construction. These eye-bars being parallel and supported on links having the same effective length when properly adjusted, it will be apparent that when the generator swings back and forth, its base will always remain parallel to its initial position and to the main suspension bars.

The generator 28 is provided with a pulley 29 mounted substantially in alinement with another pulley 30, mounted directly on the car axle 31, whereby the generator may be driven directly by a belt 32, as in the construction illustrated. The location of the belt with respect to the brake beam 32ª is shown in Fig. 3. The generator is normally constrained from moving or sliding laterally along the eye-bars 19 by the clamp collars 33 and bolts 34. It is apparent that the generator may be adjusted laterally in its position on the eye-bars by loosening the collars 33 and sliding the generator to any desired position and then reclamping the collars 33 to confine the generator against further lateral movement. Such adjustment facilitates the alining of the generator and axle pulleys 29 and 30 and enables an operator to bring them into the same vertical plane. Furthermore, it will be apparent that the tension of the belt is maintained by the springs 26 which may themselves be adjusted to any desired tension by the nuts 27, the generator during any adjustment, remaining parallel to its normal position as explained above.

From an inspection of Fig. 3 it will be apparent that by adjusting one or the other of the space bars 15, the armature shaft of the generator may be adjusted accurately to a position parallel to the car axle, provided it is first adjusted by means of nuts 20 until it is horizontal. The generator may also be adjusted bodily toward or away from said axle.

In order to prevent rattling due to a loose fit of suspension bars 1, in the holes 2, suitable means may be provided for firmly clamping said bars against the truck frame in which the hole occurs. In Figs. 4 and 5 is shown one form of clamping means. A hook bolt 35 having a bent over upper end 36, is dropped over bar 1 through a hole 37 in the truck frame 3, the lower end of said rod being secured by a nut 38. Another form is shown in Figs. 6, 7 and 8 in which a clamp 39 is hooked over the lower flange of channel member 3 and is adapted to receive the lower end of the hook bolt 40, the upper end of which is bent over the main suspension bar 1. This form of clamping means is a desirable one, as no additional holes in the truck frame are necessary.

In Figs. 11 and 12 there is shown a simple form of nut lock consisting of a strip of sheet metal 40, having two holes 41, 41, adapted to receive the rod or link 17, when said strip is bent as shown in Fig. 11. The outwardly turned ends of the strip 40, engage the faces of the nuts 20, 20, and prevent them from turning.

From the above description, it will be seen that the main projecting portions of the suspension bars are separated from each other the maximum distance, being substantially in line with the extreme outer members of the car truck, as seen best in Fig. 1. The slings, each comprising a pair of pivoted links and a cross-bar therebetween, constitute a carriage upon which the generator may be readily adjusted transversely of the car truck. The eye-bars may be vertically adjusted at either end to insure that each pivotal support 18 shall carry its proper proportion of the weight, slight inaccuracies of manufacture causing frequently an improper distribution of said weight, and to enable the armature shaft to be brought into parallel relation to the car axle horizontally, and to raise and lower the entire generator vertically toward or away from the carriage support constituted by the suspension bars 1 to equalize clearances between generator and rail, generator and underframe of car, between belt and brake beam and between belt and end of truck frame. Furthermore, the generator may be adjusted toward or away from the car axle to regulate the tension of the belt, and the supporting links on either side may be adjusted toward or away from the car truck independently of the other side, or simultaneously therewith. It will be further apparent that the generator as a whole is mounted very low on the truck, and that said generator does not extend materially above the depressed portion of the transverse truck members, thus leaving the truck with substantially the same generous clearance space as if the generator was not present. Although the generator is mounted very low, it is nevertheless sufficiently high above the road-bed and rails to fulfil the customary requirements in this regard.

I desire that the various terms used in the preceding portion of the specification shall be interpreted as having been used in a descriptive sense and not in a limiting sense. Furthermore, I desire to have it understood that various changes may be made in the structure described, without departing from the spirit of the invention as expressed in the appended claims.

Having described my invention, what I claim and desire to secure by Letters Patent of the United States, is—

1. A generator suspension comprising an integral car truck frame of cast metal, and longitudinal suspension bars fitting within parts of said frame and fulcrumed directly on portions of said frame at the end thereof, whereby downward displacement of said bars is resisted by said ends.

2. A generator suspension comprising in combination, an integral truck frame of cast metal having channel shaped portions, and longitudinal suspension bars fitting in said portions and extending through openings therein, said bars being held in fixed spaced relation by the walls of said openings.

3. A generator suspension comprising in combination, a car truck frame having channel shaped members and longitudinal suspension bars fitting in and passing through openings in said members and extending beyond the end of said truck, said bars being supported directly by the lower walls of said openings.

4. A generator suspension comprising in combination, an integral steel car truck frame having parallel outer members and longitudinal suspension bars fitting within said members and fulcrumed at the ends of said members in openings through which said bars pass.

5. A generator suspension comprising in combination, a car truck frame with parallel channel members having openings adjacent the ends thereof, suspension bars fitting in said openings, whereby said bars are held in upright spaced relation by the wall of said openings, and a generator carried by said bars.

6. In combination, a car truck frame of cast metal, said frame having integral parallel channel members with openings near the ends thereof, suspension bars fitting in the said openings and supported by the walls thereof, and means associated with said bars for supporting a generator.

7. In combination, an integral car truck frame of cast steel having openings at one end of said frame, suspension bars fitting in said openings, and a generator carried by said bars, whereby downward displacement of said generator is resisted by the lower walls of said openings.

8. In combination, an integral truck frame of cast steel having openings in one end thereof, suspension bars passing through said openings and confined by a distant part of said frame, and a generator suspended by said bars, whereby the downward thrust caused by said generator is resisted directly by said end.

9. In combination, a steel car truck frame having openings in one end thereof, longitudinal bars passing through said openings and fulcrumed therein, each bar having an inner end which coöperates with a distant part of said frame whereby said bars only coöperate directly with said frame at the fulcrums and at said inner ends, the opposite ends of said bars extending beyond the frame and a generator carried by said ends.

10. In combination, a steel car truck frame having openings therein, said car truck frame having parallel channel members, parallel suspension bars passing through said openings with their rear ends secured under the flanges of said members, said bars being free of said members between said rear ends and said openings, said bars being fulcrumed in said openings and extending beyond the end of said frame, and a generator suspended by the ends of said bars, whereby the weight of said generator tends to maintain the relative positions of the parts.

11. Generator suspension means comprising a metal truck frame and suspension bars for a generator, said bars passing through openings in the end of said frame and fulcrumed therein, said frame having parts engaging said bars from above to prevent downward displacement of the outer ends, said bars being free of said frame between said openings and the inner ends of said bars.

12. A generator suspension comprising a truck frame of cast metal, longitudinal suspension bars fitting within parts of said frame and held in substantially parallel relation thereby, and a pair of substantially U-shaped members pivotally suspended from said bars.

13. A generator suspension comprising a truck frame of cast metal, longitudinal suspension bars fitting within parts of said frame and held in substantially parallel relation thereby, and a pair of substantially U-shaped members pivotally suspended from said bars, and movable longitudinally thereof.

14. A generator suspension comprising a truck frame of cast metal, longitudinal suspension bars fitting within parts of said frame and held in substantially parallel relation thereby, and a pair of substantially parallel U-shaped members pivotally suspended from said bars and arranged substantially at right angles thereto, said members being movable longitudinally of said bars, and means for holding said members in spaced relation.

15. In combination, a generator suspension comprising a cast steel truck frame having channel shaped members, longitudinal suspension bars fitting in said members and extending beyond the end of said truck, sliding members carried by said bars and movable longitudinally thereof, links pivotally suspended by said sliding members, said bars having downwardly extending portions, connections between the same and said sliding members for adjusting said members longitudinally of said bars, a tension device connecting each of the downwardly extending portions of said bars to one of said links, and a generator carried by said links.

16. A generator suspension comprising a truck frame of cast metal, longitudinal suspension bars fitting within parts of said frame and fulcrumed at one end thereof, and a pair of supporting members pivotally suspended from said bars.

17. A generator suspension comprising a truck frame of cast metal, longitudinal suspension bars fitting within parts of said frame and fulcrumed at one end thereof, and a pair of supporting members pivotally suspended from said bars, said members having vertically adjustable portions.

18. A generator suspension comprising a metal car truck, longitudinal suspension bars located within the outer side members of said truck and fulcrumed in openings therein, a pair of substantially parallel members pivotally suspended from said bars and adapted to support a generator, said members consisting of links having cross members adjustably secured thereto.

19. A generator suspension comprising an integral metal car truck frame having openings in one end thereof, suspension bars received within parts of said frame and fulcrumed in said openings, and means for holding said bars firmly against a wall of each of said openings to prevent rattling.

20. In combination, an integral truck frame of cast metal, bosses on said frame, generator suspension bars fitting within said frame and passing through openings in said frame and bosses, diagonal braces secured to said bars and to said frame at points below said bars, and a generator carried by said bars.

21. A generator suspension comprising substantially parallel U-shaped members pivoted from above, each member comprising vertical links and cross bars adjustably secured adjacent the lower ends of said links, said cross-bars having a depressed middle portion, and a generator carried by said depressed portions.

22. In combination, a metal car truck frame having outside members and having a depressed end sill connecting the ends of said members, suspension bars projecting through openings in the end of said frame, a generator supported beyond the end of said truck by said bars below the level thereof, and diagonal braces extending from the outer portions of said bars to said depressed end sill, whereby access to said generator is unimpeded from above and beyond the same.

23. A generator suspension comprising suspension bars extending beyond the end of a car truck, depending pivoted links supported thereby beyond the end of said truck, and means detachably secured to said links adjacent their lower ends for supporting a generator.

24. A generator suspension comprising suspension bars extending beyond the end of a car truck, depending pivoted links supported thereby beyond the end of said truck, and means detachably secured to said links adjacent their lower ends for supporting a generator, said generator being adjustable along said means.

25. A generator suspension comprising suspension bars extending beyond the end of a car truck, depending pivoted links supported thereby beyond the end of said truck, and means detachably connected to said links adjacent their lower ends for supporting a generator, said links being adjustable along said suspension bars to move the generator toward and away from the driving axle.

26. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and cross-bars detachably connected to the lower ends of said links to support a generator.

27. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and cross-bars detachably secured to the lower ends of said links to support a generator, said generator being adjustable along said cross-bars.

28. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and cross-bars detachably connected to the lower end of said links to support a generator, said links being adjustable along said suspension members.

29. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and cross-bars detachably connected to the lower ends of said links to support a generator, said generator being adjustable along said cross-bars and said links being adjustable along said suspension members.

30. A supporting cradle for a car lighting generator comprising two pairs of depending pivoted links and a pair of cross-bars, each cross-bar being detachably secured to the lower ends of a pair of opposite links and of a length sufficient to permit adjustment of the generator back and forth along the same.

31. A suspension for an axle driven generator including two members in parallel planes, each member comprising depending pivoted links and a cross-bar supported by said links, said cross-bar being adjustable vertically on said links.

32. A suspension for an axle driven generator including two members in parallel planes, each member comprising depending pivoted links and a cross-bar detachably secured thereto and of a length sufficient to permit free lateral adjustment of the generator thereon.

33. A suspension for an axle driven generator including two supporting devices each comprising two depending portions and a transverse portion detachably connected to said depending portions adjacent their lower ends, said transverse portions being adapted to support a generator and of a length sufficient to permit lateral adjustment thereof through a wide range.

34. A generator suspension comprising cross-bars suspended by pivotal links, said cross-bars being detachably secured to said links and adjustable to different positions relatively to said links, and a generator removably carried by said cross-bars.

35. A generator suspension including a carriage supported from above, a generator removably mounted on said carriage adjustable longitudinally with respect thereto and also vertically adjustable toward or away from the carriage support.

36. A generator suspension including two pairs of depending pivoted links, one pair being arranged at each side of the suspension, a pair of cross-bars detachably secured to the opposite links adjacent their lower ends and adjustable with relation thereto, and a generator removably mounted upon said cross-bars.

37. A generator suspension for carrying a car-lighting generator upon a car truck having slings each made up of depending links and a cross-bar, the cross-bars being detachably secured to said links and serving to carry the generator.

38. In combination, a car truck and a generator support carried thereby, said support including slings detachably secured to the truck, said slings being constructed with depending links and cross-bars detachably secured between said links, and a generator removably mounted on said cross-bars.

In witness whereof, I have hereunto subscribed my name in the presence of two witnesses.

WILLIAM L. BLISS.

Witnesses:
HENRY A. VOGT,
GEO. B. JONES.